June 26, 1962 A. KOLIN 3,040,571
ELECTROMAGNETIC FLOWMETER FOR CONDUCTIVE FLUIDS
Filed July 29, 1957 3 Sheets-Sheet 1

INVENTOR

Alexander Kolin.

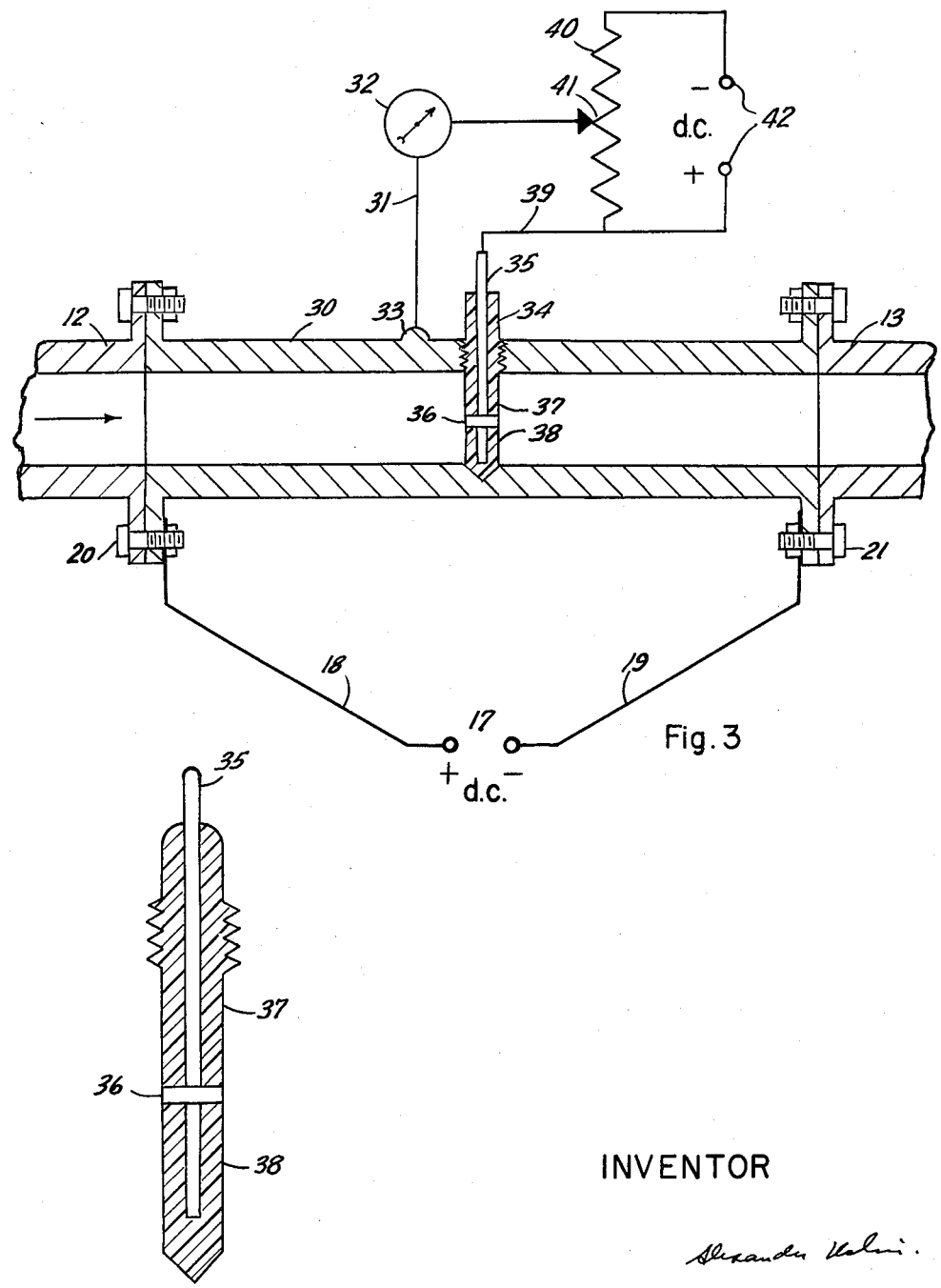

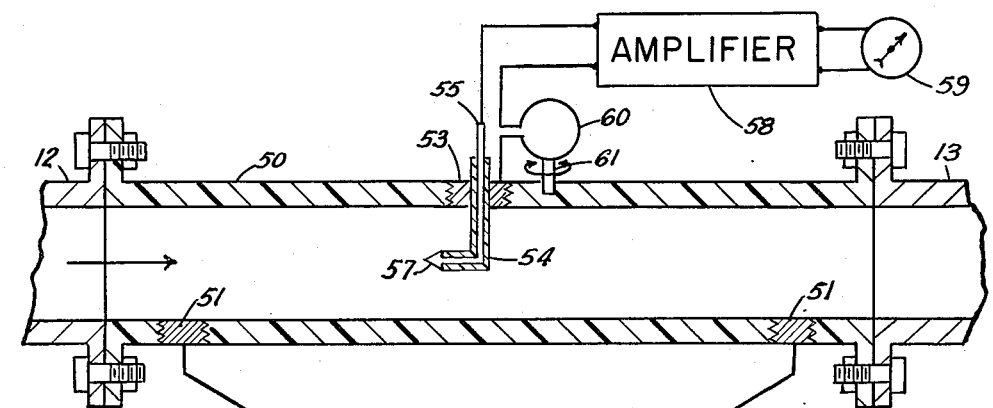
Fig. 5
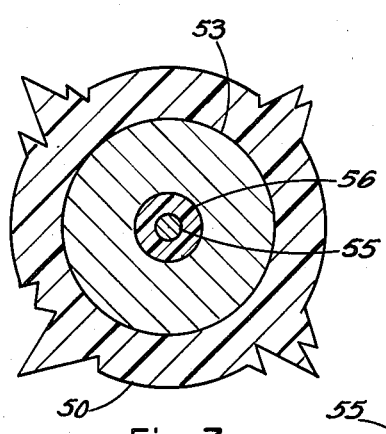
Fig. 7
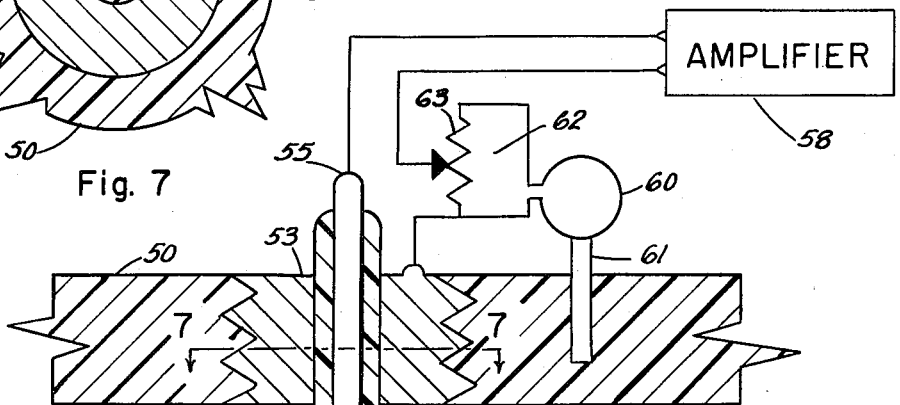
Fig. 6
INVENTOR
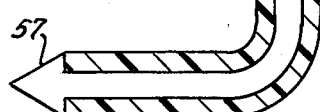

United States Patent Office 3,040,571
Patented June 26, 1962

3,040,571
ELECTROMAGNETIC FLOWMETER FOR CONDUCTIVE FLUIDS
Alexander Kolin, Los Angeles, Calif., assignor to the United States of America as represented by the Secretary of the Navy
Filed July 29, 1957, Ser. No. 674,904
5 Claims. (Cl. 73—194)

This invention relates generally to apparatus for sensing fluid flow by electromagnetic means and particularly to an electromagnetic flowmeter for conductive fluids.

While electromagnetic flowmeters of various types and designs are well known in the prior art, such meters are generally characterized by having large and weighty external magnets for creating a homogeneous magnetic field further utilized in measuring the flow of fluid passing through said meter in the vicinity of the poles of the external magnet. Where the flowmeter comprises a conduit or throat through which the fluid is passed, this homogeneous magnetic field is established transverse to the direction of fluid flow so that the flowing fluid passes therethrough. The volume rate of fluid flow is then found by measuring the voltage induced in the fluid integrated over a conduit diameter perpendicular to the conduit axis and to the magnetic field vector. Such types of flowmeters are influenced greatly by the velocity profiles of the fluid passing therethrough and various complex means are required to properly compensate for variations in these velocity profiles.

It has now been found that in the sensing of the flow of conductive fluids through a conduit, an instrument reading may be obtained which is linearly proportional to the volume rate of flow and independent of the velocity profile. This instrument reading is obtained by measuring the induced voltage in a fluid moving through a substantially axially symmetrical non-uniform magnetic field generated by a current passing through the fluid in the conduit parallel to the conduit axis.

An object of this invention, therefore, is to dispense with the bulky external magnets employed in previous electromagnetic flowmeters.

Another object of this invention is to provide an improved electromagnetic flowmeter for conductive fluids embodying the advantages set forth above.

Other objects, special features, and advantages of the invention will become more apparent in view of the following detailed description and accompanying drawings wherein:

FIG. 3 is a schematic diagram of another embodiment of the invention;

FIG. 4 is an enlarged cross-sectional elevation of the modified electrode shown in FIG. 3;

FIG. 5 is a schematic diagram of another embodiment of the invention;

FIG. 6 is a schematic diagram showing a modified form of sensing circuitry and electrode structure from that shown in FIG. 5; and FIG. 7 is a cross-sectional plan view taken on the line 7—7 of FIG. 6.

Figure 1:
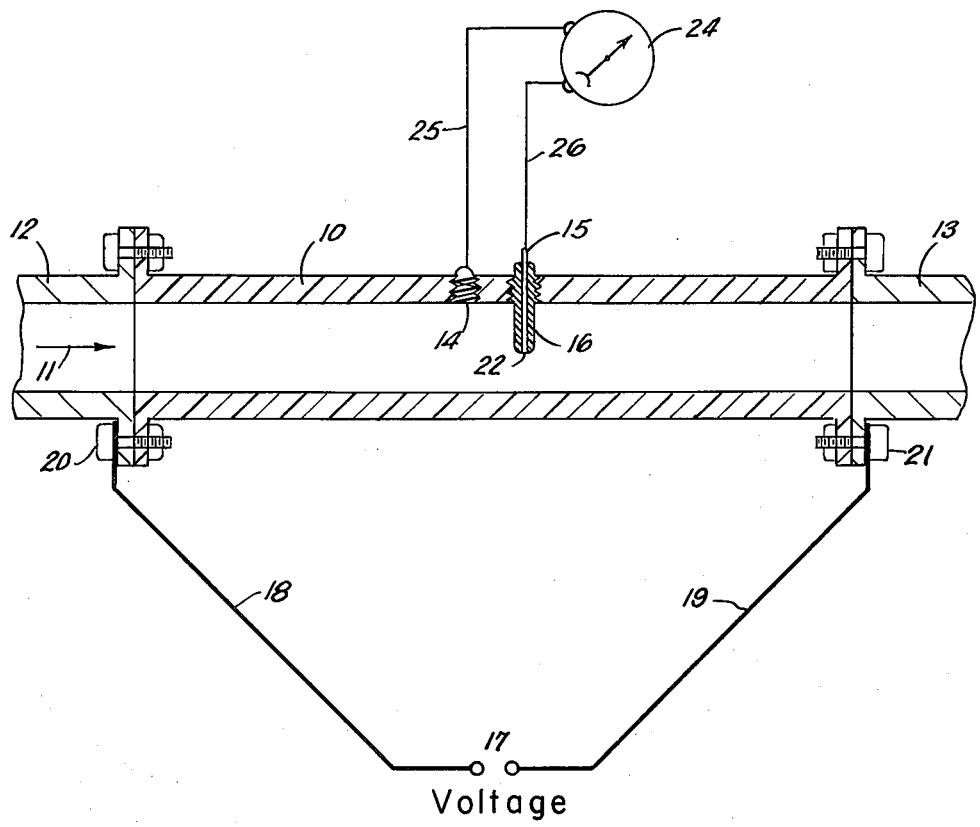
FIGURE 1 is a schematic diagram of one embodiment of the invention showing the conduit in cross-section.
Figure 2:
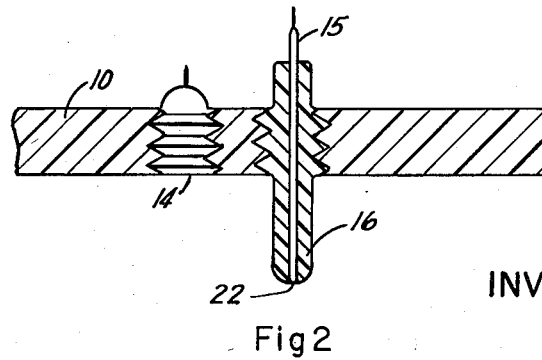
FIG. 2 is an enlarged cross-sectional partial elevation of a section of conduit wall showing the electrode construction of FIG. 1.

With reference to FIGS. 1 and 2, a dielectric conduit section 10 is shown connected between two metallic conduit sections 12 and 13. The system of conduits is filled with a fluid conductor such as a liquid metal or a strong electrolyte. While for purposes of description we may consider the flow of conductive fluid to be from left to right, as shown by the arrow 11, actually the liquid may flow in either direction. A source of energizing electric voltage is indicated at the connection points 17 which are connected by electrical leads 18 and 19 to the metallic conduit flange bolts 20 and 21.

An electrode 14 is provided for insertion into a threaded hole in the dielectric conduit 10 and is mounted with its inner surface flush, or substantially so, with the inner wall of the conduit section. Elongated metal electrode 15 is of a sufficient length to reach from the axis of the conduit section to a location beyond the outer wall thereof. This electrode 15 is coated with an externally threaded insulating covering 16 which covers all portions of the electrode inside of the conduit except at its very tip 22 where electric contact with the fluid at the conduit axis is made. The covering 16 with its electrode 15 may be inserted through a threaded hole in the conduit section 10, spaced from the electrode 14. While these electrodes are shown in parallel relationship in the same plane and installed fairly close together, they may be installed at any distance apart and in any manner so that electrode 14 contacts the fluid at the inner conduit wall and tip 22 of electrode 15 contacts the fluid at its axial center.

Electrodes 14 and 15 are connected by electrical leads 25 and 26, respectively, to an instrument 24 which may be a sensitive voltmeter calibrated to read in units of volume flow.

The principle of operation of the embodiment of the invention shown in FIGS. 1 and 2 is described as follows:

The diameter of conduit section 10 is preferably small as compared to its length. Under these conditions, a unidirectional current derived from a voltage source 17 passed through the fluid conductor in the conduit section 10 will give rise to a magnetic field represented by circular field lines of a magnetic flux density $B(r)$ which is given in the interior of the conduit as a function of the radial distance $r$ from the conduit axis by the expression:

$$B(r) = \frac{\mu_0}{2}[J \times r] \qquad (1)$$

where $J$ is the current density in amp./m.$^2$; $B(r)$ the magnetic flux density in Webers/m.$^2$; $\mu_0 = 4\pi.10^{-7}$, the permeability of space; and $r$ is measured in meters.

As the fluid conductor moves through this magnetic field, a potential gradient is induced in it which varies from point to point due to the fact that the magnetic flux density $B(r)$, as well as the fluid velocity $V$, varies in space in an axially symmetrical fashion. The induced electric field is given as the gradient of the potential $V$ by the expression:

$$\text{grad } V = [V \times B] \qquad (2)$$

This reduces in cylindrical coordinates to the following expression for the induced radial field:

$$|dV/dr| = V_z B_o \qquad (3)$$

where $V_z$ designates the fluid velocity in the direction of the conduit axis and $B_o$ the magnetic flux density which, at any particular point, is perpendicular to the conduit radius and to the conduit axis.

The potential difference $V$ measured between the center and the periphery of the fluid in the conduit under the specified conditions is given by the integral:

$$|V| = \int_0^R B(r)f(r)\,dr = \mu_0 \frac{J}{4\pi} \int_0^R 2\pi r f(r)\,dr \qquad (4)$$

where $R$ is the inside radius of the conduit 10; $B(r) = B_o$; and $f(r) = V_z$. No other assumptions are made about the velocity distribution $V_z = f(r)$ except that it is axially symmetrical.

The expression under the integral on the right side in equation 4 has the significance of $Q$, the volume rate of flow in cubic meters per second traversing the conduit.

Hence, we obtain for the potential difference V between the center and the inside wall of the conduit:

$$V = 10^{-7} JQ \qquad (5)$$

This equation 5 shows that, at a constant current density J, the reading of the voltmeter 24 in FIG. 1 is a linear function of the volume rate of flow Q. If mere indication rather than measurement of flow is sufficient, any means of sensing or detecting the potential difference between the pick-up electrodes 14 and 15 may be used. As the preceding calculation indicates, the induced voltage is independent of the electrical conductivity of the fluid conductor and, hence, the calibration at any given constant value of J is independent of the conductivity of the fluid conductor.

With further reference to FIG. 1, the source of electric voltage connected to connection points 17 may be a storage battery, a D.C. motor generator, or any other suitable means for producing a substantially constant unidirectional current including a source of pulsating E.M.F. producing a pulsating current of constant average value. Being electrically connected to connection points 17, the metallic conduit sections 12 and 13 serve as energizing contact electrodes conveying the current derived from the voltage source to the conductive fluid in conduit 10.

With reference to FIGS. 3 and 4, the measuring conduit section 30 may be made of any suitable metal. In this case, the conduit itself may constitute the peripheral pick-up electrode connected to the lead 31 of the sensing device or instrument 32. A point of connection between the lead 31 and the conduit 30 is indicated at 33 which connection may be a weldment or braze or any other suitable form of connection. Metal conduit sections 12 and 13 are secured to the flanges of the measuring conduit section 30 by means of the usual flanges and flange bolts as indicated by bolts 20 and 21. Connection points 17 are provided for the connection of a source of D.C. voltage. These points 17 are connected by heavy electrical leads 18 and 19 to their respective flange bolt connections 20 and 21. Thus, in this embodiment, the energizing current is introduced at the ends of the measuring section 30 and the current passes through the walls of the conduit section 30 as well as through the conductive fluid passing therethrough.

The pick-up electrode 34 comprises a metallic rod-like core 35 having a metallic washer 36 affixed thereto. The electrode 35 is covered with cylindrical dielectric or insulating portion 37 and 38 which are separated and abut against the washer 36. The upper portion 37 is shown as having an external thread which is inserted into a threaded hole provided in the wall of the conduit section 30. The lower portion 38 is provided with a pointed end which fits into a similarly shaped depression formed in the conduit wall opposite the threaded hole. The periphery of washer 36 is exposed to contact with the conductive fluid and is so positioned on its rod-like electrode core 35 as to be on the axis of the conduit. The outer end of the core 35 is electrically connected to the lead 39 which is connected to the sensing device 32 through its associated apparatus.

The method of sensing the induced E.M.F. in the conductive fluid between the inner wall of the conduit section 30 and the centrally disposed contact washer electrode 36, as shown in this embodiment, FIGS. 3 and 4, comprises a galvanometer 32 or some other suitable null type instrument, a potentiometer 40 having a moving contact 41 and a source of constant E.M.F. ocnnected to the connection points 42. This auxiliary E.M.F. maintains a constant potential drop across the resistor portion of the potentiometer. The moving or sliding contact 41 is connected through the galvanometer to the measuring conduit section at 33. One end of the potentiometer resistor portion is connected to the external end of the pick-up electrode 35. At a given rate of fluid flow, the moving contact 41 is set so as to cancel out the conductive fluid E.M.F. as indicated on the galvanometer, resulting in a zero reading of that meter. The position of moving contact 41 at cancellation is indicated against a scale which serves as a measure of the rate of flow.

While the preceding embodiments have been illustrated and described as utilizing a constant or pulsating source of D.C. current for energizing the conductive fluid flowing through the measuring conduit sections, it may be more convenient to use an A.C. source, particularly where larger energizing currents are required. The substitution of an A.C. source for the previous D.C. source with the attendant changes in circuitry are indicated in FIGS. 5, 6, and 7.

With reference to FIG 5, a dielectric conduit section 50 is coupled in the usual manner to the two metallic conduit sections 12 and 13. Two metallic plug contact electrodes 51 are threadedly installed near the ends of the dielectric measuring section 50 so that their inner contact faces are substantially flush with the inner wall of the conduit. A source of A.C. E.M.F. in the form of a step-down transformer 52 is shown connected to the two plug electrodes 51.

Two forms of pick-up electrodes are shown, by way of illustration, as centrally disposed with relation to the measuring conduit section. Pick-up electrode 53 is a hollow metallic threaded cylinder threadedly inserted in a hole provided in the wall of the conduit section 50. Pick-up electrode 54 comprises a right-angle bent rod-like core 55 covered by a dielectric or insulating cover 56. The core 55 may be provided with a conical tip 57 which is positioned on the axis of the conduit section and may be pointed facing against the direction of flow. The upper portions of the core 55 and its covering 56 protrude externally of the conduit wall and pass through the aperture formed in the hollow cylindrical electrode 53.

The alternating current is supplied by the secondary of the stepdown transformer 52 connected to the conductive fluid in conduit 50 through the energizing contact electrodes 51. This alternating current traversing longitudinally through the conductive fluid gives rise to an alternating magnetic field. The flow of the conductive fluid through this field induces an alternating E.M.F. which is in phase with the magnetic field and which is picked up by the pick-up electrodes 53 and 55. The same relations established for the induced E.M.F. in the constant magnetic field hold also for the instantaneous average, effective and/or maximum values of the induced alternating E.M.F. generated in the alternating magnetic field.

The induced alternating voltage is conveyed to the input of amplifier 58 whose output is connected to a suitable sensing device 59. If the signal induced by flow is strong enough, the amplifier may be omitted.

When the apparatus is energized with A.C., there is a transformer E.M.F. induced at zero flow in the input lead circuit from the pick-up electrodes to the sensing devices. This voltage must be compensated for so as to obtain a zero instrument reading at zero flow. This compensation may be accomplished in various ways. The preferred method is shown in FIG. 5. A coil 60 comprising several turns of wire is mounted on a shaft 61 so that it can be rotated about the vertical axis of the shaft. This coil is connected in series with the lead wire connecting the pick-up electrode 53 to one side of the amplifier input. In the orientation shown, the magnetic field surrounding the conduit 50 penetrates the coil area perpendicularly so the effective E.M.F. induced in it is a maximum. This induced E.M.F. is in phase with the transformer E.M.F. to be compensated but the two E.M.F.'s have unequal amplitudes. By rotating the coil 60 about the axis of shaft 61, the amplitude of the E.M.F. induced in the coil can be diminished until it equals the amplitude of the unwanted transformer E.M.F. Since rotation of the coil 60 through 180° causes a phase reversal, the E.M.F. derived from coil 60 can be put in phase opposition to the transformer E.M.F. and thus made to cancel it.

FIG. 6 illustrates another circuitry for the same objective, i.e., the elimination of the undesired transformer E.M.F. Here the coil 60 may be fixed in a plane substantially parallel to the conduit axis. The current derived from coil 60 is passed through a divider or potentiometer circuit 62 where a fraction of the voltage developed across the resistor 63 may be used in phase opposition to the transformer E.M.F. to cancel it. The electrode 54 in FIG. 6 is provided with a rounded right-angle bend instead of the sharp angular bend shown in FIG. 5.

FIG. 7 shows a cross-sectional view of the two pick-up electrodes used in FIGS. 5 and 6 as installed in a section of the wall of conduit 50.

While certain specific embodiments of the invention have been illustrated and described, it should be realized that the parts are interchangeable from one embodiment to another. Furthermore, while the pick-up electrodes have been shown close together, they may be installed anywhere in the measuring conduit section, regardless of its length so long as one makes contact with the periphery of the column of conductive fluid passing therethrough and the other makes fluid contact at the longitudinal axis of the conduit section. The measuring conduit sections 10, 30, and 50 may be either metallic or non-metallic. The voltage sources for the conductive fluid energizing currents may be either direct or alternating current sources. The whole conduit system may be of dielectric material so long as two contact electrodes are provided to conduct the energizing currents to a selected portion of the conductive fluid passing therethrough. The contact electrodes 51 shown in FIG. 5 could be two concentric rings mounted on the inner wall at the ends of the measuring section, each ring being provided with an external electrical connection leading to the main voltage source. Many other modifications may suggest themselves to those skilled in the art. All such modifications would undoubtedly fall within the spirit of the invention and within the scope of the appended claims, wherein I claim:

1. Electromagnetic flow sensing means comprising a dielectric conduit, energizing electrodes spaced apart along the conduit and adjacent to the ends of the conduit, through which electrodes a current can be passed through the conductive fluid in the conduit, a pick-up electrode passing through the conduit wall flush with its inside wall so as to make contact with the periphery of the fluid flowing through the conduit, a pick-up electrode passing through the conduit wall covered with dielectric material except at its tip which is located along the conduit axis and makes contact with the center of the fluid column flowing through the conduit and a device connected to both pick-up electrodes to sense the potential difference between the center and the periphery of the fluid column in the conduit.

2. An electromagnetic flow meter for measuring the flow of a conductive fluid through a conduit comprising, in combination:

means for passing an electric current longitudinally through the conductive fluid flowing through a selected length of said conduit whereby an axially symmetrical non-homogeneous magnetic field is established in the conductive fluid and whereby a potential difference is created radially through said conductive fluid between the geometric center of said conduit and the wall of said conduit;

means for sensing the magnitude of said potential difference; and indicating means for converting said potential difference to a measure of the flow of said conductive fluid through said selected length of conduit in volume units per unit of time.

3. Electromagnetic flow sensing means comprising a dielectric conduit with metallic energizing electrodes passing through its wall, one near each end of said conduit, means of generating an alternating current connected to said electrodes so as to communicate electrically with the conductive fluid flowing through the conduit, a first pick-up electrode passing through the wall of said dielectric conduit, an insulating coating covering said electrode everywhere except near the central axis of said conduit, a concentric metal ring insulated from said electrode and surrounding it at its point of passage through said wall so as to effect an electric contact between said ring and the conductive fluid flowing through said conduit thus serving as the second pick-up electrode, a coil rotatably mounted on the outside of said conduit, said coil being connected at one end to the second pick-up electrode and an alternating current voltmeter connected to the first pick-up electrode and to the other end of said coil.

4. An electromagnetic flow meter for measuring the flow of a conductive fluid through a conduit comprising, in combination:

a selected portion of said conduit having a longitudinal axis;

means connected to the ends of said selected portion for passing an electric current longitudinally through the conductive fluid flowing in said selected portion whereby an axially symmetrical non-homogeneous magnetic field is established in the conductive fluid in said portion, said magnetic field having zero intensity at the longitudinal axis of said portion of conduit and a maximum intensity at the inner wall of said portion of conduit whereby a potential difference is created radially through said conductive fluid between the axis and the inner wall of said portion of conduit;

means located at the axis and wall of said portion of conduit for sensing the magnitude of said potential difference; and indicating means for converting said potential difference to a measure of the flow of said conductive fluid through said conduit.

5. Electromagnetic flow sensing means comprising, in combination:

a conduit through which conductive fluid flows;

means for passing an electric current through the conductive fluid in a selected portion of said conduit, said means including conductive fluid contact electrodes disposed longitudinally with relation to said selected portion and said electric current being passed substantially parallel to the longitudinal axis of said conduit portion;

electrode means for contacting said conductive fluid at the inner wall of said conduit and substantially at the longitudinal axis of said conduit; and means for sensing and indicating the voltage generated between said electrode means.

References Cited in the file of this patent

UNITED STATES PATENTS

| | | |
|---|---|---|
| 2,637,208 | Mellen | May 5, 1953 |
| 2,691,303 | De Boisblanc | Oct. 12, 1954 |
| 2,733,604 | Coulter | Feb. 7, 1956 |
| 2,746,291 | Swengel | May 22, 1956 |